(12) United States Patent
Grebel (10) Patent No.: US 11,584,218 B2
(45) Date of Patent: Feb. 21, 2023

(54) AIR FLAP APPARATUS HAVING A TOGGLE JOINT COUPLING

(71) Applicant: Röchling Automotive SE & Co. KG, Mannheim (DE)

(72) Inventor: Karsten Grebel, Bürstadt (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 0 days.

(21) Appl. No.: 17/198,345

(22) Filed: Mar. 11, 2021

(65) Prior Publication Data

US 2021/0284011 A1 Sep. 16, 2021

(30) Foreign Application Priority Data

Mar. 13, 2020 (DE) ...................... 10 2020 107 054.3

(51) Int. Cl.
*B60K 11/08* (2006.01)
(52) U.S. Cl.
CPC .................................. *B60K 11/085* (2013.01)
(58) Field of Classification Search
CPC ....... B60K 11/085; B60K 11/06; Y02T 10/88; F28D 2021/008
See application file for complete search history.

(56) References Cited

U.S. PATENT DOCUMENTS

| | | | |
|---|---|---|---|
| 1,660,146 A * | 2/1928 | Winans | F01P 7/10 165/41 |
| 6,439,328 B1 * | 8/2002 | Vaillancourt | B60K 11/085 123/41.58 |

(Continued)

FOREIGN PATENT DOCUMENTS

| | | |
|---|---|---|
| DE | 4415459 A1 | 11/1995 |
| DE | 102011055394 A1 | 5/2013 |
| DE | 102019002333 A1 | 8/2019 |

OTHER PUBLICATIONS

Espacenet Bibliographic data: DE 102011055394 (A1), Published May 16, 2013, 1 pg.

(Continued)

*Primary Examiner* — Kurt Philip Liethen
(74) *Attorney, Agent, or Firm* — Rankin, Hill & Clark LLP (57) ABSTRACT

An air flap apparatus for a motor vehicle, encompassing:
a frame having an air passthrough opening;
a first air flap arrangement and a second air flap arrangement respectively encompassing at least one displaceable first and second air flap;
a common motion drive system for displacing the first and the second air flap arrangement;
a motion coupling for coupling both the first and the second air flap arrangement to the motion drive system, the first air flap arrangement and the second air flap arrangement being respectively displaceable between a blocking position having a greater degree of coverage of the air passthrough opening and a passthrough position having a lesser degree of coverage of the air passthrough opening; the motion coupling the first and the second air flap arrangement to the motion drive system in such a way that the first and the second air flap arrangement are drivable by the motion drive system asynchronously for a displacement motion, the motion coupling encompasses a toggle lever linkage having a first and having a second toggle lever that are connected to one another, pivotably around a toggle joint axis, to form a toggle joint; the first toggle lever being motion-transferringly coupled to the first air flap arrangement; and the second toggle lever being motion-transferringly coupled to the second air flap arrangement; and the motion drive system being motion-transferringly coupled to the first and/or to the second toggle lever.

11 Claims, 8 Drawing Sheets

(56) References Cited

U.S. PATENT DOCUMENTS

| | | | |
|---|---|---|---|
| 7,866,737 B2 | 1/2011 | Browne et al. | |
| 9,168,827 B2 * | 10/2015 | Povinelli | B60K 11/06 |
| 10,421,352 B2 * | 9/2019 | Urbach | B60K 11/085 |
| 10,696,152 B2 * | 6/2020 | Nam | B60K 11/06 |
| 11,125,310 B2 * | 9/2021 | Nolta | B60H 1/00857 |
| 2016/0288614 A1 * | 10/2016 | Wild | B60H 1/00857 |

OTHER PUBLICATIONS

Espacenet Bibliographic data: DE 102019002333 (A1), Published Aug. 29, 2019, 1 pg.
Espacenet Bibliographic data: DE 4415459 (A1), Published Nov. 9, 1995, 1 pg.

* cited by examiner

AIR FLAP APPARATUS HAVING A TOGGLE JOINT COUPLING

This application claims priority in German Patent Application 10 2020 107 054.3 filed on Mar. 13, 2020, which is incorporated by reference herein.

The present invention relates to an air flap apparatus for a motor vehicle, encompassing:
- a frame having an air passthrough opening;
- a first air flap arrangement encompassing at least one first air flap arranged displaceably on the frame;
- a second air flap arrangement, different from the first, encompassing at least one second air flap arranged displaceably on the frame;
- a common motion drive system for displacing the first and the second air flap arrangement;
- a motion coupling for coupling both the first and the second air flap arrangement to the motion drive system, the first air flap arrangement being displaceable between a blocking position having a greater degree of coverage of a first portion of the air passthrough opening and a passthrough position having a lesser degree of coverage of the first portion of the air passthrough opening;

the second air flap arrangement being displaceable between a closed position having a greater degree of coverage of a second portion, different from the first, of the air passthrough opening and an open position having a lesser degree of coverage of the second portion of the air passthrough opening;

the motion coupling the first and the second air flap arrangement to the motion drive system in such a way that the first and the second air flap arrangement are drivable by the motion drive system asynchronously for a displacement motion between a blocking operating state in which the first air flap arrangement is in the blocking position and the second air flap arrangement is in the closed position, and a passthrough operating state in which the first air flap arrangement is in the passthrough position and the second air flap arrangement is in the open position.

The present invention furthermore relates to a motor vehicle having such an air flap apparatus.

BACKGROUND OF THE INVENTION

An air flap apparatus of this kind for a motor vehicle, and a motor vehicle of that kind, are known from DE 10 2017 222 678 A1.

The teaching of this document is to drive a shifting drum, having control grooves on the enveloping surface, by way of the common motion drive system to rotate and, by means of the control grooves and control pegs guided therein, to displace the first air flap arrangement, and the second air flap arrangement positionally offset therefrom, asynchronously between the aforesaid operating states. "Asynchronously" means here that the two air flap arrangements are displaced between the blocking operating state and the passthrough operating state, by operation of the motion drive system, in such a way that the first and the second air flap arrangement travel different displacement distances in identical driving time segments even though the operation of the motion drive system is uniform for the two air flap arrangements. The first and the second air flap arrangement therefore exhibit, in a plurality of intermediate operating states between the blocking operating state and the passthrough operating state, air flap positions that cover to different degrees their respective portion of the air passthrough opening.

The air flap apparatus known from DE 10 2017 222 678 A1 makes it possible to establish this state of a different coverage of the portions of the air passthrough opening which are respectively associated with the two air flap arrangements by way of a corresponding course of the two control grooves, and corresponding rotation of the shifting drum.

A disadvantage of the air flap apparatus known from DE 10 2017 222 678 A is the outlay associated with manufacture and assembly of the shifting drum that carries the control grooves.

A further air flap apparatus, in which the first air flap arrangement and the second air flap arrangement are coupled to one another by a motion coupling for an asynchronous displacement, is known from DE 10 2011 055 394 A1. This air flap apparatus uses a cam plate as a motion coupling, and is also complex in terms of manufacture and assembly.

An air flap apparatus having a first and a second air flap arrangement, which are coupled by means of a Bowden cable for motion together, is known from DE 10 2019 002 333 A1. Bowden cables are subject to a certain stretching over their service life under load, however, and are thus at risk of a loss of precision as the service life proceeds.

SUMMARY OF THE INVENTION

An object of the present invention is therefore to refine the air flap apparatus recited initially in such a way that the asynchronous displacement of the first and the second air flap arrangement between the passthrough operating state and the blocking operating state is reliably achievable using means of simpler design, while still utilizing only one motion drive system.

The present invention achieves this object by means of an air flap apparatus of the kind recited initially in which the motion coupling encompasses a toggle lever linkage having a first and having a second toggle lever that are connected to one another, pivotably around a toggle joint axis, to form a toggle joint; the first toggle lever being motion-transferringly coupled to the first air flap arrangement pivotably around a first toggle lever axis at a first distance from the toggle joint axis; and the second toggle lever being motion-transferringly coupled to the second air flap arrangement pivotably around a second toggle lever axis at a second distance from the toggle joint axis; and the motion drive system being motion-transferringly coupled to the first and/or to the second toggle lever.

The first and the second air flap arrangement are consequently coupled to one another for motion together by way of a toggle lever linkage encompassing only two toggle levers. The advantage of a toggle lever linkage is usually that proceeding from a collapsed linkage position in which the two toggle levers enclose a quantitatively smaller angle around their toggle joint, with increasing proximity to an extended linkage position in which the two toggle levers enclose an angle of 180° around their toggle joint, the transmission ratio with which a drive motion displacing the toggle joint is transferred to a toggle-joint-remote end of a toggle lever increasingly changes to a motion step-down and a force step-up.

Whereas in the present case it is not important to achieve quantitatively greater forces in the vicinity of the extended linkage position, the invention nevertheless utilizes, in terms of motion kinematics, the transmission ratio that changes depending on the linkage position.

Advantageously, on the air flap apparatus of the present invention the toggle lever linkage is mounted in undetermined fashion to the extent that neither the first nor the second toggle lever is mounted in stationary fashion relative to the frame constituting the stationary reference system of the air flap apparatus. Both toggle levers of the toggle lever linkage are thus not only pivotable relative to the frame of the air flap apparatus constituting the stationary reference system, but also displaceable translationally relative to the frame. What can thereby be achieved is that with increasing proximity to an extended linkage position, only a negligible motion of an air flap arrangement is still taking place despite motion of the motion drive system, while a significant motion of both air flap arrangements can occur in more-collapsed linkage positions of the toggle lever linkage.

For optimum utilization of the advantageous kinematics usually furnished by a toggle lever linkage, provision is therefore preferably made, in order to achieve an asynchronous displacement of the two air flap arrangements coupled to the toggle lever linkage, that the toggle lever linkage is located, both in the blocking operating state and in the passthrough operating state, closer to an extended linkage position than to a collapsed linkage position. The toggle lever linkage is preferably shifted from a more-extended position into a more-collapsed position, and back again into a more-extended position, upon a shifting of the air flap apparatus between the blocking operating state and the passthrough operating state. Superimposed on this collapsing motion is a translational motion of the entire toggle lever linkage relative to the frame orthogonally to the toggle lever axis.

Both in the blocking operating state and in the passthrough operating state, the toggle levers can enclose between them an angle around the toggle joint axis which is substantially quantitatively identical. The angles enclosed by the toggle levers around their toggle lever axis in the blocking operating state and in the passthrough operating state preferably differ by no more than 15%, preferably by no more than 10%, particularly preferably by no more than 5%, with reference to the larger of the two angles that occur in the aforesaid operating states. Particularly preferably, the angles enclosed in the blocking operating state and in the passthrough operating state are of identical magnitude.

When the air flap apparatus is in the blocking operating state, however, the toggle lever linkage is translationally displaced orthogonally to the toggle joint axis in terms of its location when the air flap apparatus is in the passthrough operating state. This means that all the axes involved in the toggle lever linkage—first toggle lever axis, second toggle lever axis, and toggle joint axis—become displaced orthogonally to their respective axial course upon the transition between a blocking operating state and a passthrough operating state.

This translational displacement of each of the three axes involved in the constitution of the toggle lever linkage can be achieved by the fact that the first and the second toggle lever axis are respectively displaced with the air flap arrangement that is coupled to them.

For a maximally definite expression of the asynchronous displacement of the first and the second air flap arrangement, i.e. for a maximally definite separation between displacement phases of the first and of the second air flap arrangement upon operation of the common motion drive system, it is advantageous if the two toggle levers are of approximately equal length, or if the first and the second distance between the common toggle joint axis and the respective first or second toggle lever axis associated with only one of the toggle levers are of approximately equal length. Provision is therefore made, in accordance with an advantageous refinement of the present invention, that the first distance between the toggle joint axis and the first toggle lever axis and the second distance between the toggle joint axis and the second toggle lever axis differ by no more than 15%, preferably by no more than 10%, particularly preferably no more than 5%, with reference to the quantitatively greater distance from among the first and the second distance.

In principle, the motion drive system can transfer a motion to one of the two toggle levers, constituting the driven toggle lever, in any manner. The motion drive system preferably encompasses a crank arm which is pivotable by the motion drive system around a drive pivot axis and which is articulated pivotably around a crank axis, at a distance from the drive pivot axis, on at least one of the toggle levers. Thus not only the toggle levers of the toggle lever linkage, but also the crank arm that transfers motion and force or torque from the motion drive system, are rotationally movable. The drive pivot axis is preferably fixed to the frame.

In order to achieve a maximally long displacement travel for both the first and the second air flap apparatus, it is advantageous if the crank arm, drivable by the motion drive system preferably only to rotate, introduces the force of the motion drive system into the toggle lever linkage as close as possible to the toggle joint. For that reason, the crank distance, to be measured from the crank axis to the toggle joint axis, differs by no more than 15%, preferably by no more than 10%, particularly preferably by no more than 5%, from the quantitatively greater distance from among the first and the second distance. Particularly preferably, for the reasons recited, the crank axis is the toggle joint axis, so that the toggle joint axis can be displaced directly by the motion drive system. When a component portion of the crank arm which defines the crank axis is articulated directly on a component or component portion that defines the toggle joint axis, according to the present Application the crank arm is considered to be articulated both on the first and on the second toggle lever. Because of the preferably exclusively rotational movability of the crank arm, the toggle joint axis is preferably displaceable only along a circular path around the drive pivot axis.

Maximum displacement asynchronicity, simultaneously with a long displacement travel for the first and the second air flap arrangement, can be obtained to a considerable degree with particularly simple means by the fact that in one operating state from among the blocking operating state and the passthrough operating state, the distance between the drive pivot axis and the first toggle lever axis is equal to no more than 25%, preferably no more than 20%, particularly preferably no more than 15%, of the quantitatively greater distance from among the first and the second distance. This means that in at least one of the aforesaid operating states, the first toggle lever axis is located in the vicinity of the drive pivot axis, so that at the beginning of a displacement operation the crank arm and the first toggle lever execute an at least similar pivoting motion, since preferably not only is the drive pivot axis located in the vicinity of the first toggle lever axis but also, as stated above, the crank axis is always located in the vicinity of the toggle joint axis.

In order to achieve the same kinematics in both displacement directions of the first and the second air flap arrangement, it is furthermore preferred if, in the respective other operating state from among the blocking operating state and the passthrough operating state, the distance between the drive pivot axis and the second toggle lever axis is equal to no more than 25%, preferably no more than 20%, particularly preferably no more than 15%, of the quantitatively greater distance from among the first and the second distance.

It is advantageous if the drive pivot axis is located close to a toggle lever axis in one or in both aforesaid final operating states from among the blocking operating state and the passthrough operating state. In order for the relevant toggle lever not to be only rotated by the crank arm, however, it is advantageous if in each of the final operating states, a distance differing from zero exists between the drive pivot axis and the two toggle lever axes.

Maintenance of the distance relationships described in the two paragraphs recited above, simultaneously with articulated attachment of the crank arm to the crank axis in the above-described vicinity of the toggle joint axis, makes it possible to achieve an advantageous kinematic situation in which, proceeding from one of the final operating states, firstly one of the two toggle levers is moved predominantly rotationally and the respective other toggle lever is moved predominantly translationally, such that upon approach to the respective other final operating state, the respective other toggle lever is then moved predominantly rotationally and the respective one toggle lever predominantly translationally. The toggle lever linkage thus makes it possible to use the rotational motion of a toggle lever as a kind of "neutral" motion that converts the motion of the motion drive system into no displacement, or only a negligible displacement, of the air flap associated with the toggle lever currently being moved predominantly rotationally in the respective displacement phase, while the translational motion of a toggle lever is usable as a "useful" motion that converts a motion of the motion drive system into a very considerable displacement of the air flap arrangement associated with the toggle lever being moved translationally.

The aforementioned percentages for the length differences of the first distance, second distance, and crank distance constitute an upper limit within which the present invention can usefully be applied, even when each indicated percentage region is maximally exhausted in the same direction for all the aforesaid distances. It is more advantageous, however if the aforesaid distances do not move to the limits of the respective maximally possible tolerance range, but instead the distance differences are quantitatively balanced. Provision is therefore advantageously made that each individual distance from among the first distance, second distance, and crank distance differs by no more than 15%, preferably by no more than 10%, particularly preferably no more than 5%, from the arithmetic distance mean of the first distance, second distance, and crank distance.

Although the first and the second air flap arrangement can each comprise only one displaceable air flap, an air passthrough opening of maximum size is advantageous for modifying the largest possible volume of convective air flow. A large air passthrough opening can also be effectively influenced in terms of its flowthrough capability if the first air flap arrangement comprises a plurality of first air flaps that are connected to one another for displacement motion together, and/or that the second air flap arrangement comprises a plurality of second air flaps that are connected to one another for displacement motion together.

The displacement motion of all the first air flaps of a plurality of first air flaps is preferably of the same kind, i.e. all the first air flaps are displaceable either translationally or rotationally. The same applies to the displacement motion of all the second air flaps in the case in which a plurality of second air flaps are provided. A translational motion of a first or second air flap is possible by converting the motion of the associated first or second toggle lever into a displacement motion of the at least one air flap, for instance by way of an interposed linkage or a motion deflection.

Preferably the at least one first air flap is pivotable around a first flap pivot axis, and/or the at least one second air flap is pivotable around a second flap pivot axis. Pivotable air flaps enable a maximum possible quantitative change in the area of the air passthrough opening covered by them, along with a minimum requirement for installation space for them.

In order to avoid unnecessary motion-transferring linkages and/or mechanisms, preferably all the first pivot axes of all the first air flaps are parallel to one another, and all the second pivot axes of all the second air flaps are parallel. In addition, preferably the at least one first and the at least one second pivot axis are parallel to one another.

In order to avoid unnecessary frictional and/or deformational losses, preferably the toggle joint axis and the first and the second toggle lever axis are parallel to one another, particularly preferably also the drive pivot axis.

Again in order to avoid unnecessary frictional and/or deformational losses upon the transfer of motion to the at least one first and/or at least one second air flap, the first toggle joint axis is parallel to the first flap pivot axis, and the second toggle joint axis is parallel to the second flap pivot axis.

The present invention further relates to a motor vehicle that carries, preferably at its front end in the region of a radiator grill, an air flap apparatus as described and refined above. The frame of the air flap apparatus is preferably connected in stationary fashion to the vehicle body.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Referring now to the drawings wherein the showings are for the purpose of illustrating preferred and alternative embodiments of the invention only and not for the purpose of limiting the same, FIGS. 1 to 7 depict a vehicle V, shown merely schematically as a partial outline, having an air flap apparatus 10 carried by vehicle V. Air flap apparatus 10 is in the blocking operating state in FIG. 1 and in the passthrough operating state in FIG. 7. FIGS. 2 to 6 show intermediate operating states as air flap apparatus 10 transitions between the blocking operating state and the passthrough operating state.

Air flap apparatus 10 encompasses a frame 12 which is fixedly connected to vehicle V or to the vehicle body or to the vehicle frame and which, in accordance with the present Application, is regarded as a stationary component of air flap apparatus 10 and is thus intended to serve as a stationary reference system for describing the movable components of air flap apparatus 10 which are mounted on the frame, and their motion.

Figure 1:
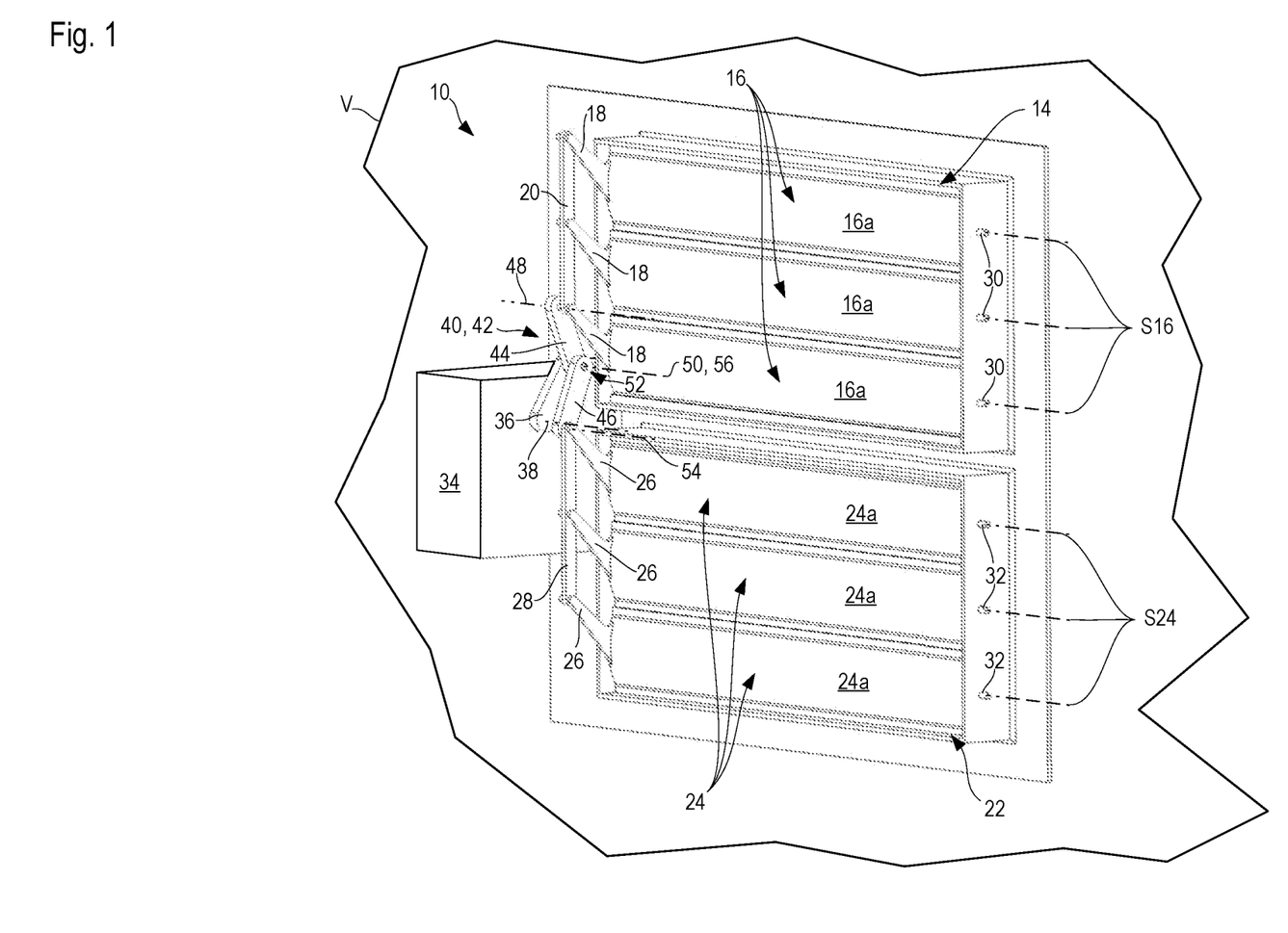
FIG. 1 is a perspective view of an embodiment according to the present invention of a motor vehicle having an air flap apparatus of the present Application, in the blocking operating state.
Figure 4:
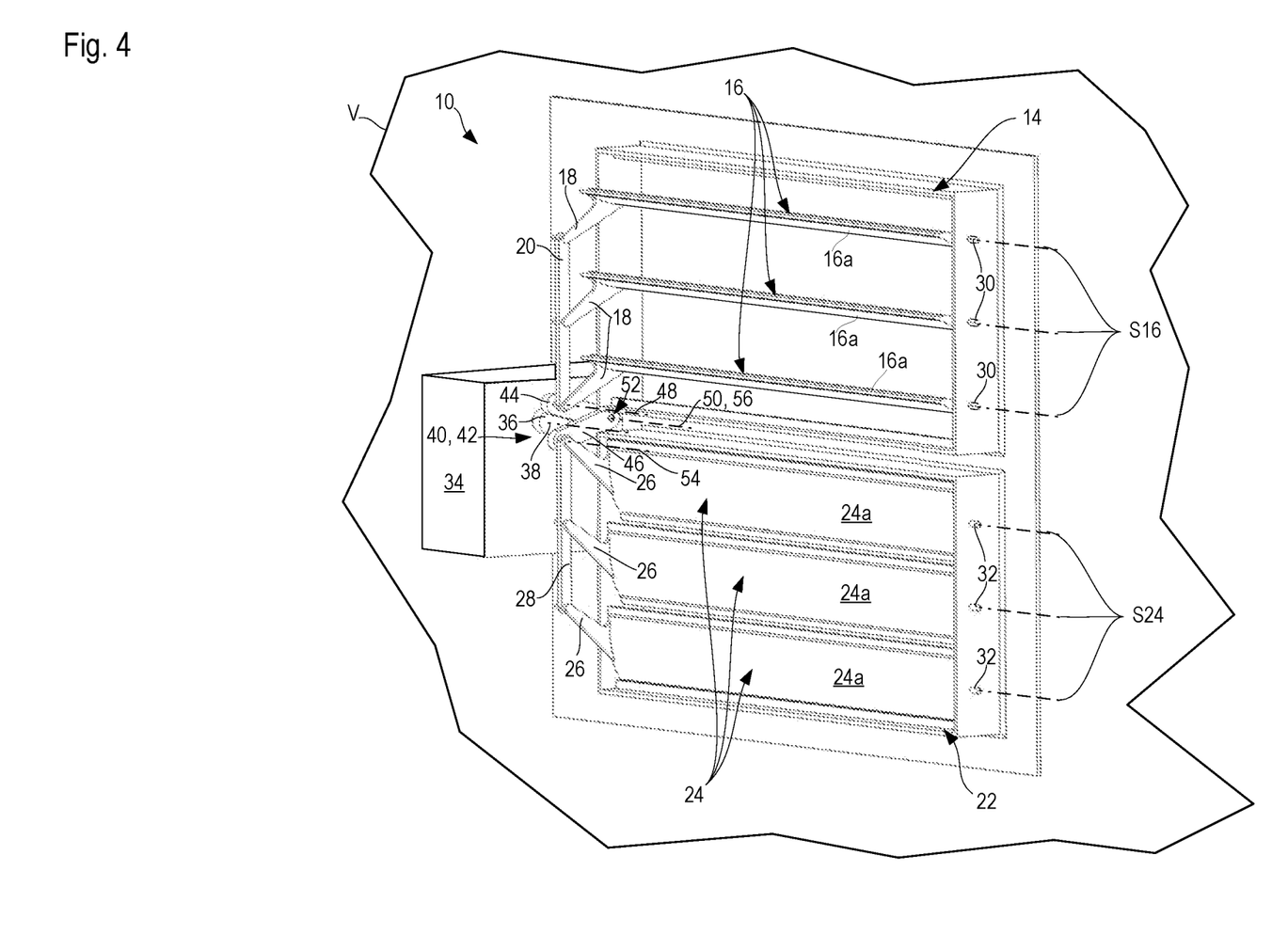
Figure 5:
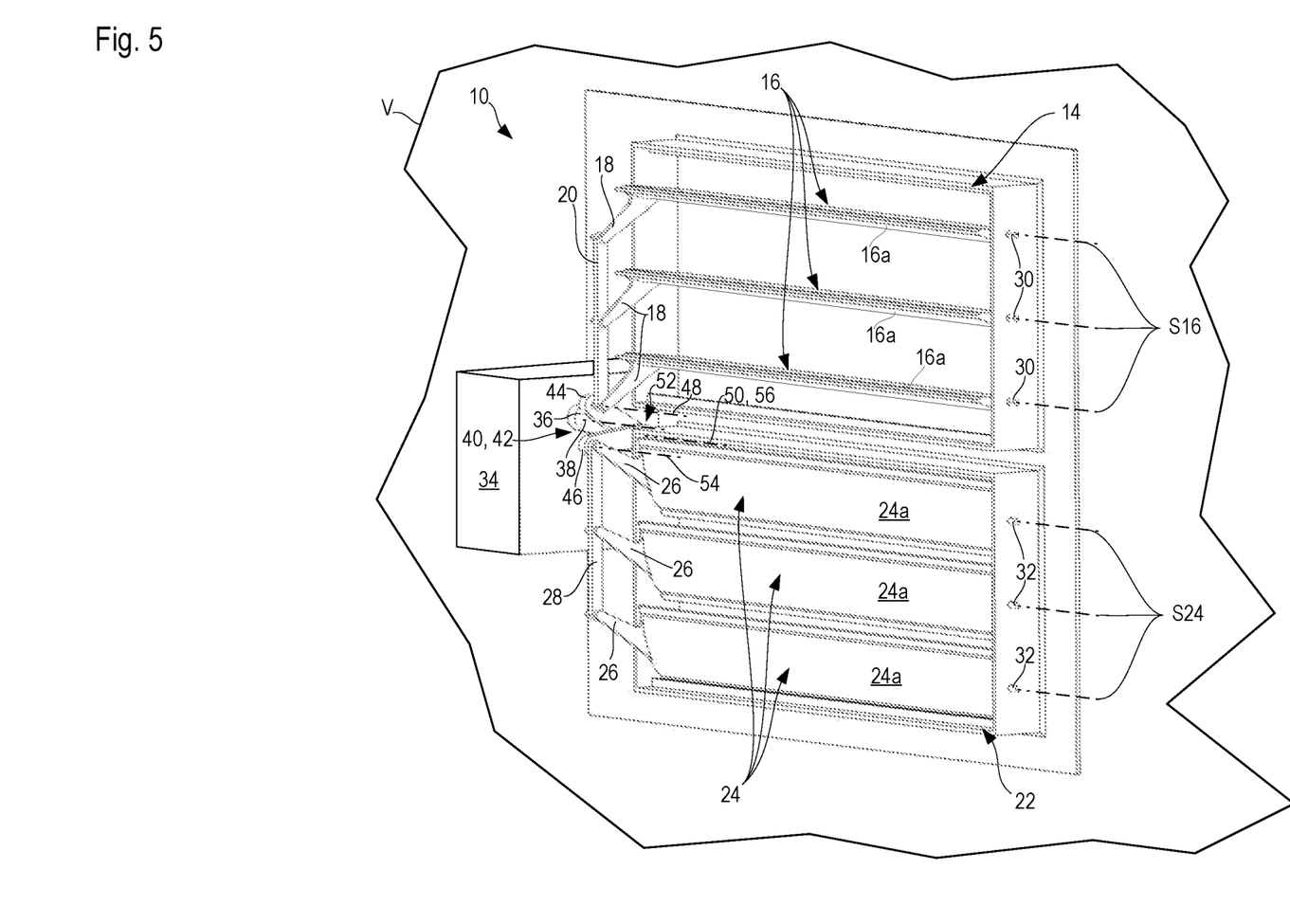
Figure 6:
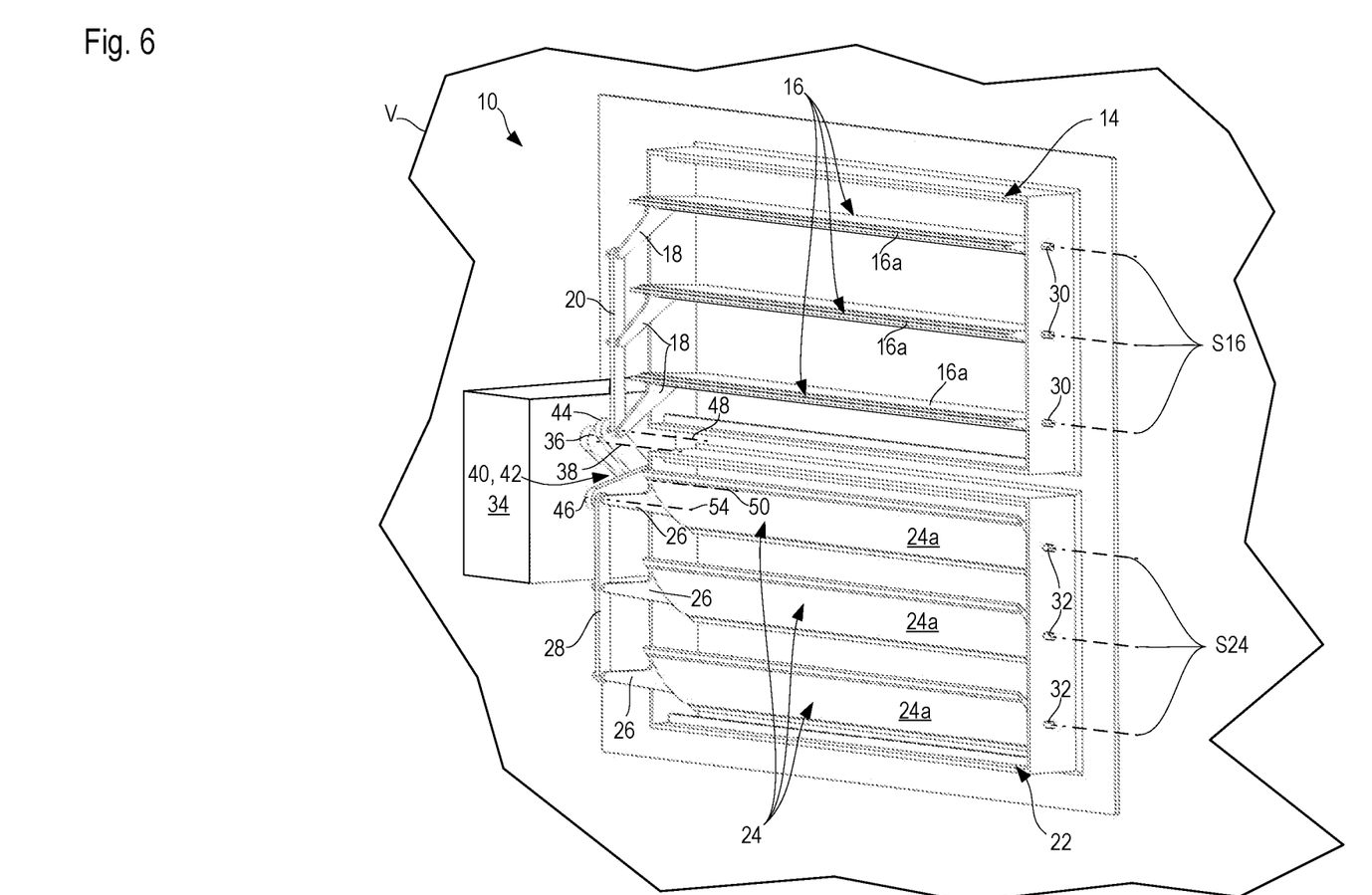

Air flap apparatus 10 encompasses a first (upper, in FIG. 1) air flap arrangement 14 having, by way of example, three identically embodied first air flaps 16 that are mounted on frame 12, pivotably around mutually parallel first flap pivot axes S16, between the blocking position shown in FIG. 1 and a passthrough position that has been reached for the most part, for instance, in FIG. 4.

First air flaps 16 are each coupled relatively pivotably, via an articulation lever 18 rigidly connected to flap blade 16a of first air flaps 16, to a first connecting strut 20 for displacement motion together.

Figure 3:
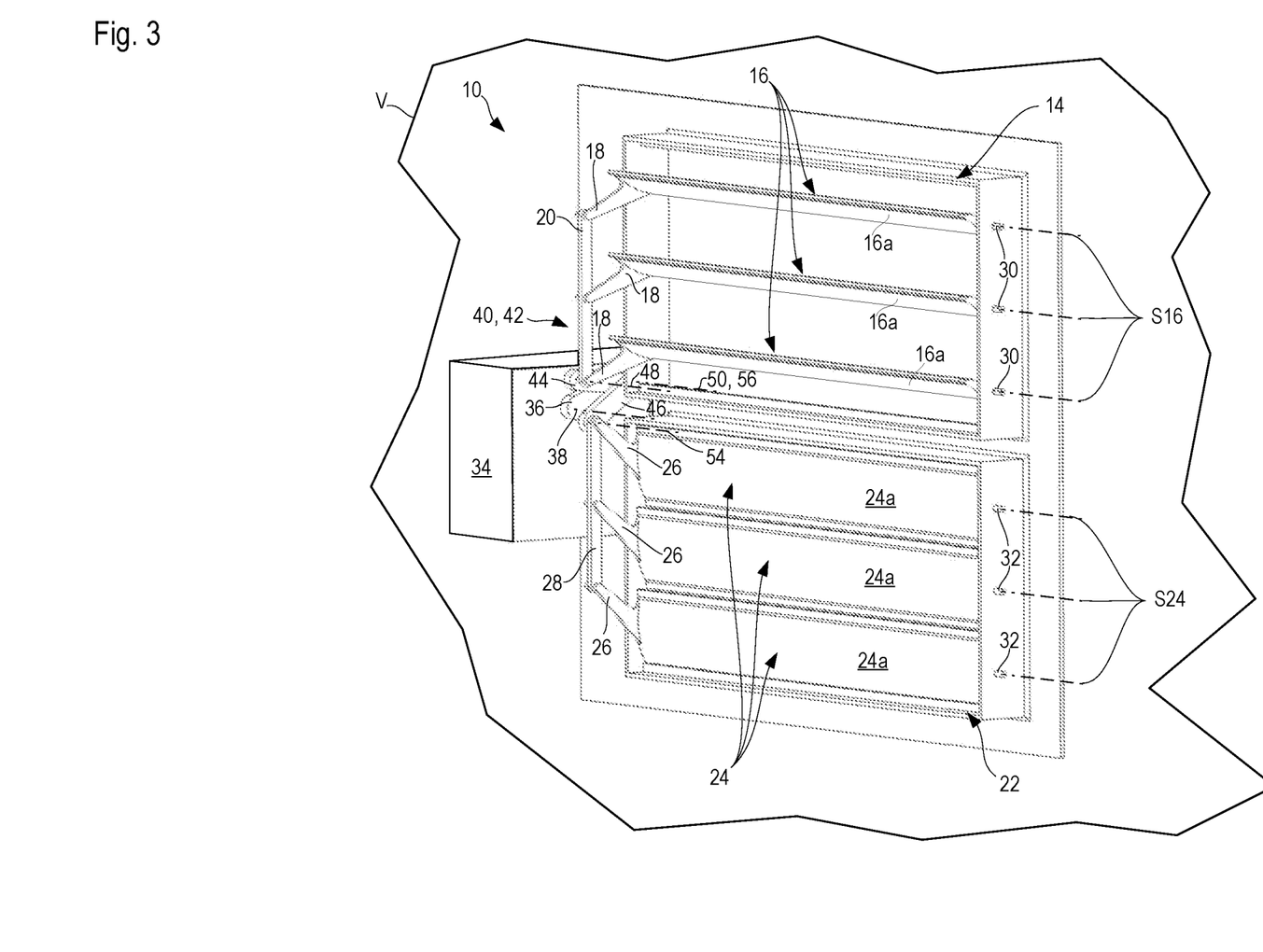
Figure 7:
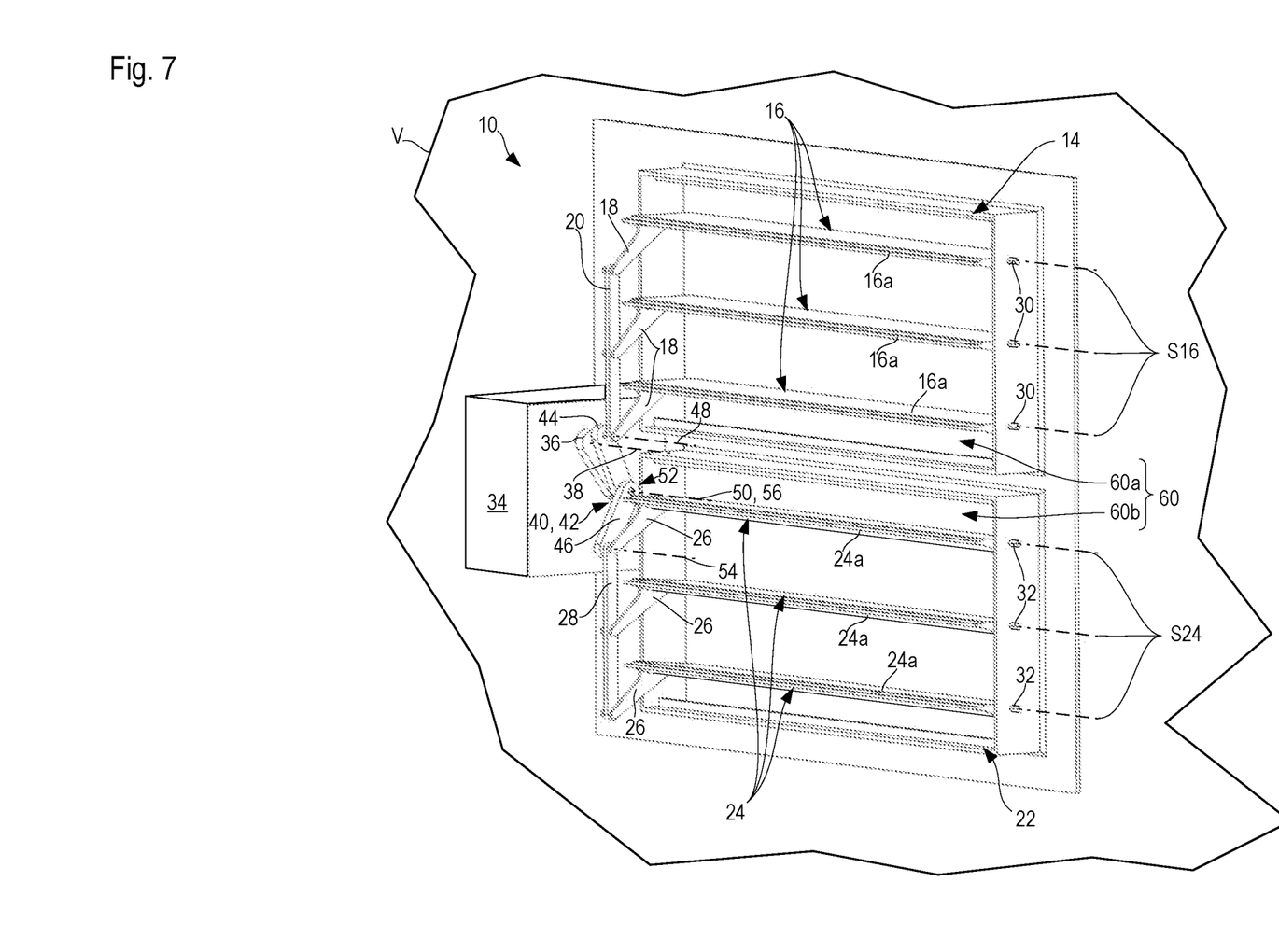
FIG. 7 is the view of FIG. 1 with the air flap apparatus in the passthrough operating state.

Air flap apparatus 10 furthermore encompasses a second (lower, in FIG. 1) air flap arrangement 22 once again having, by way of example, three identically embodied second air flaps 24 that are mounted on frame 12, pivotably around mutually parallel second flap pivot axes S24, between the closed position that is shown in FIG. 1 and is for the most part maintained until the operating state of FIG. 3, and the open position shown in FIG. 7.

Second air flaps 24 and first air flaps 16 are in fact embodied substantially identically, which considerably simplifies the production and assembly thereof. Second air flaps 24 are therefore also each coupled relatively pivotably, via an articulation lever 26 rigidly connected to flap blade 24a of second air flaps 24, to a second connecting strut 28 for displacement motion together.

First air flaps 16 and second air flaps 24, including their respective first and second rotary-bearing pegs 30 and 32, are preferably manufactured in one piece as an injection-molded component.

Air flap apparatus 10 furthermore encompasses a motion drive system 34, implemented for example by way of an electric motor 36, which is arranged in stationary fashion relative to frame 12. Motion drive system 34 can be arranged on frame 12 or on the vehicle frame or on a frame-mounted component of vehicle V.

Motion drive system 34 comprises a rotatable output shaft (not depicted) which carries a crank arm 36 that is rotatable by motion drive system 34 around a drive pivot axis 38. Along with motion drive system 34, drive pivot axis 38 is also stationary or frame-mounted.

A motion coupling 40, in the form of a toggle lever linkage 42, is provided for motion coupling of the respective first and second air flap arrangements 14 and 22 to one another. Toggle lever linkage 42 comprises a first toggle lever 44 and a second toggle lever 46.

First toggle lever 44 is coupled, pivotably around a first toggle lever axis 48, to first connecting strut 20 and to all first air flaps 16.

Figure 8:
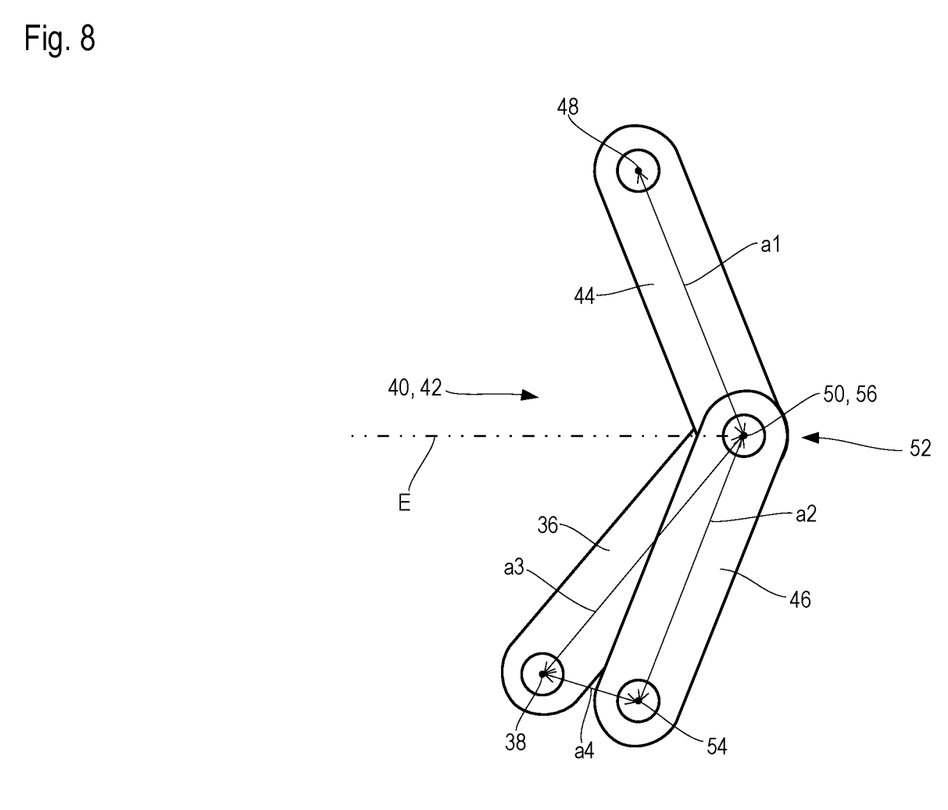
FIG. 8 is an axial view of the toggle lever linkage and of the crank arm of FIG. 1 along the mutually parallel axes: first and second toggle lever axis, toggle joint axis, crank axis, and drive pivot axis.

As is evident in particular from FIG. 8, first toggle lever 44 is connected, pivotably around a toggle joint axis 50 at a first distance a1 from first toggle lever axis 48, to second toggle lever 46, forming a toggle joint 52.

Second toggle lever 46 is connected, pivotably around a second toggle lever axis 54 at a second distance a2 from toggle joint axis 50, to second connecting strut 28. In the preferred exemplifying embodiment depicted, distances a1 and a2 are quantitatively equal in magnitude.

Toggle lever linkage 42 therefore does not have any single stationary arrangement or attachment with respect to frame 12, so that not only does toggle lever linkage 42 comprise rotationally displaceable toggle levers 44 and 46, but both toggle levers 44 and 46 of toggle lever linkage 42 are displaceable translationally relative to frame 12.

Crank arm 36 is connected, pivotably around a crank axis 56 at a crank distance a3 from drive pivot axis 38, to toggle joint 52 and thus to both toggle levers 44 and 46. In the present preferred exemplifying embodiment, crank axis 56 is identical to toggle joint axis 50. Crank distance a3 is selected to be slightly greater, for instance 5 to 10% greater, than the quantitatively greater distance from among first distance a1 and second distance a2. Since the two distances a1 and a2 are of equal magnitude in the present instance, this statement applies to both distances.

In the blocking operating state shown in FIGS. 1 and 8, distance a4 between drive pivot axis 38 and second toggle lever axis 54 is equal to no more than 25% of the quantitatively greater distance from among first distance a1 and second distance a2. Since the two distances a1 and a2 are of equal magnitude in the present instance, this statement applies to both distances.

In the example depicted, the position of toggle lever linkage 42 in the passthrough operating state shown in FIG. 7 is substantially the same as in the blocking operating state shown in FIG. 1, except that toggle lever linkage 42 has been displaced over the pivot distance, which is traveled upon the shift from the passthrough operating state into the blocking operating state, of crank axis 56 that is identical to toggle joint axis 50. In the passthrough operating state of FIG. 7, first toggle lever axis 48 is then located closer than second toggle lever axis 54 to the stationary drive pivot axis 38, the distance between drive pivot axis 38 and first toggle lever axis 48 in the passthrough operating state preferably likewise corresponding to distance a4 between drive pivot axis 38 and second toggle joint axis 56 in the blocking operating position.

In the preferred embodiment of FIGS. 1 to 8, a subassembly made up of toggle lever linkage 42 and toggle levers 36 articulated thereon occupies, in the blocking operating state and in the passthrough operating state, mirror-image configurations with reference to a plane E that contains toggle joint axis 50 and bisects the angle constituted between first and second toggle levers 44 and 46 in the blocking and passthrough operating states.

Figure 2:
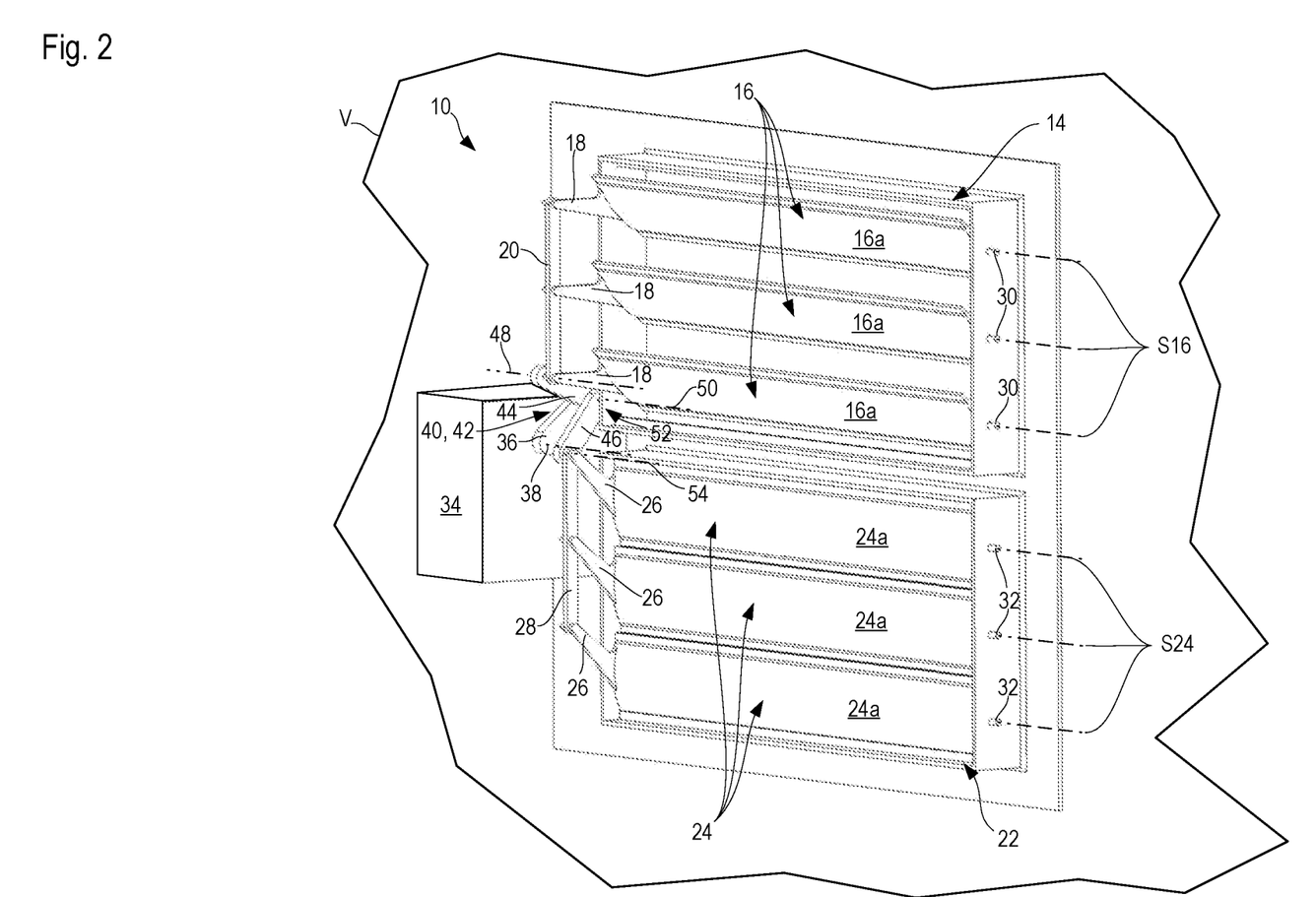
FIGS. 2 to 6 are perspective views of the motor vehicle having an air flap apparatus of FIG. 1 in intermediate operating states between the blocking operating state of FIG. 1 and the passthrough operating state of FIG. 7, the intermediate operating states increasingly approaching the passthrough operating state as the Figure numbers increase, and vice versa.

In FIG. 2, crank arm 36 has been rotated some distance around drive pivot axis 38, clockwise from the perspective of the viewer of FIGS. 1 to 7. But because drive pivot axis 38 is located close to second toggle lever axis 54, the pivoting motion of crank 36 produces, in the transition from FIG. 1 to FIG. 2, a predominantly rotational motion of second toggle lever 46 and more greatly translational motion of first toggle lever 44. First air flaps 16 of first air flap arrangement 14 are therefore moved to a greater degree out of their blocking position than are second air flaps 24 of second air flap arrangement 22 out of their closed position. The displacement of second air flap arrangement 22 in the transition from FIG. 1 to FIG. 2 is negligible.

In the transition from FIG. 2 to FIG. 3, and further to each subsequent Figure, crank arm 36 always executes a rotational motion increment clockwise around drive pivot axis 38. From FIG. 2 stepwise via each individual intervening Figure, the rotational motion component of second toggle lever 46 decreases and its translational motion component increases. Conversely, the translational motion component of first toggle 44 decreases stepwise and its rotational motion component increases stepwise.

With the decrease in the rotational motion component of a toggle lever, the displacement magnitude transferred from motion drive system 34 via the toggle lever to the air flap coupled to its toggle lever axis decreases, and with the increase in the translational motion component of a toggle lever the transferred displacement magnitude increases. The result thereby achieved is that the two air flap arrangements 14 and 22 can be displaced asynchronously between the depicted blocking operating state and the depicted passthrough operating state of air flap apparatus 10 using only one motion drive system 34.

In the transition between the passthrough operating state and the blocking operating state, toggle lever linkage 42 is firstly shifted from a more-extended linkage position into a more-collapsed linkage position, and then back into a more-extended linkage position. Simultaneously with this collapsing motion of toggle lever linkage 42, toggle lever linkage 42 is displaced translationally orthogonally to the mutually parallel axes of toggle lever linkage 42.

FIG. 7, in which the passthrough operating state is depicted, clearly shows the first (upper, in FIG. 1) partial air passthrough opening 60a and the second (lower, in FIG. 1) partial air passthrough opening 60b, which together constitute an air passthrough opening 60 of air flap apparatus 10.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An air flap apparatus for a motor vehicle, encompassing:
   a frame having an air passthrough opening;
   a first air flap arrangement encompassing at least one first air flap arranged displaceably on the frame;
   a second air flap arrangement, different from the first, encompassing at least one second air flap arranged displaceably on the frame;
   a common motion drive system for displacing the first and the second air flap arrangement;
   a motion coupling for coupling both the first and the second air flap arrangement to the motion drive system,
   the first air flap arrangement being displaceable between a blocking position having a greater degree of coverage of a first portion of the air passthrough opening and a passthrough position having a lesser degree of coverage of the first portion of the air passthrough opening;
   the second air flap arrangement being displaceable between a closed position having a greater degree of coverage of a second portion, different from the first, of the air passthrough opening and an open position having a lesser degree of coverage of the second portion of the air passthrough opening;
   the motion coupling couples the first and the second air flap arrangement to the motion drive system in such a way that the first and the second air flap arrangement are drivable by the motion drive system asynchronously for a displacement motion between a blocking operating state in which the first air flap arrangement is in the blocking position and the second air flap arrangement is in the closed position, and a passthrough operating state in which the first air flap arrangement is in the passthrough position and the second air flap arrangement is in the open position,
   wherein the motion coupling encompasses a toggle lever linkage having a first toggle lever and a second toggle lever that are pivotably connected to one another around a toggle joint axis, to form a toggle joint; the first toggle lever being motion-transferringly coupled to the first air flap arrangement pivotably around a first toggle lever axis at a first distance from the toggle joint axis; and the second toggle lever being motion-transferringly coupled to the second air flap arrangement pivotably around a second toggle lever axis at a second distance from the toggle joint axis; and the motion drive system being motion-transferringly coupled to at least one of the first and the second toggle lever,
   wherein the motion drive system includes a crank arm that is selectively rotatable by the motion drive system, the crank arm having a first crank arm end operably joined relative to the motion drive system such that the crank arm is selectively rotatable by the motion drive system about a drive pivot axis, the crank arm having a second end pivotably connected to at least one of the first and the second toggle levers and wherein the first and the second toggle levers are pivotable relative to the second end of the crank arm about a crank axis that is spaced from the drive pivot axis; the toggle joint axis being coaxial with the crank axis.

2. The air flap apparatus according to claim 1, wherein the toggle lever linkage is located, both in the blocking operating state and in the passthrough operating state, closer to an extended linkage position than to a collapsed linkage position.

3. The air flap apparatus according to claim 2, wherein the toggle lever linkage is shifted from the more-extended position into a more-collapsed position, and back again into a more-extended position, upon a transition between the blocking operating state and the passthrough operating state.

4. The air flap apparatus according to claim 1, wherein the entire toggle lever linkage is also translationally displaceable relative to the frame for a transition between the blocking operating state and the passthrough operating state.

5. The air flap apparatus according to claim 1, wherein the first distance and the second distance differ by no more than 15% with reference to the quantitatively greater distance from among the first and the second distance.

6. The air flap apparatus according to claim 1, wherein the first distance and the second distance differ by no more than 5% with reference to the quantitatively greater distance from among the first and the second distance.

7. The air flap apparatus according to claim 1, wherein in one operating state from among the blocking operating state and the passthrough operating state, a distance between the drive pivot axis and the first toggle lever axis is equal to at least one of no more than 25%, no more than 20% and no more than 15%, of the quantitatively greater distance from among the first and the second distance.

8. The air flap apparatus according to claim 7, wherein in the respective other operating state from among the blocking operating state and the passthrough operating state, the distance between the drive pivot axis and the second toggle lever axis is equal to at least one of no more than 25%, no more than 20% and no more than 15%, of the quantitatively greater distance from among the first and the second distance.

9. The air flap apparatus according to claim 1, wherein the crank axis is spaced from the drive pivot axis by a crank distance, each individual distance from among the first distance, second distance, and crank distance differs by at least one of no more than 15%, no more than 10% and no more than 5%, from the arithmetic distance mean of the first distance, second distance, and crank distance.

10. The air flap apparatus according to claim 1, wherein at least one of the first air flap arrangement comprises a plurality of first air flaps that are connected to one another for displacement motion together and the second air flap arrangement comprises a plurality of second air flaps that are connected to one another for displacement motion together.

11. The air flap apparatus according to claim 1, wherein at least one of the at least one first air flap is pivotable around a first flap pivot axis and the at least one second air flap is pivotable around a second flap pivot axis.

* * * * *